R. H. GRISWOLD AND A. W. HAMMOND.
APPARATUS FOR SEEDING.
APPLICATION FILED APR. 21, 1916.
1,340,654.
Patented May 18, 1920.
2 SHEETS—SHEET 1.
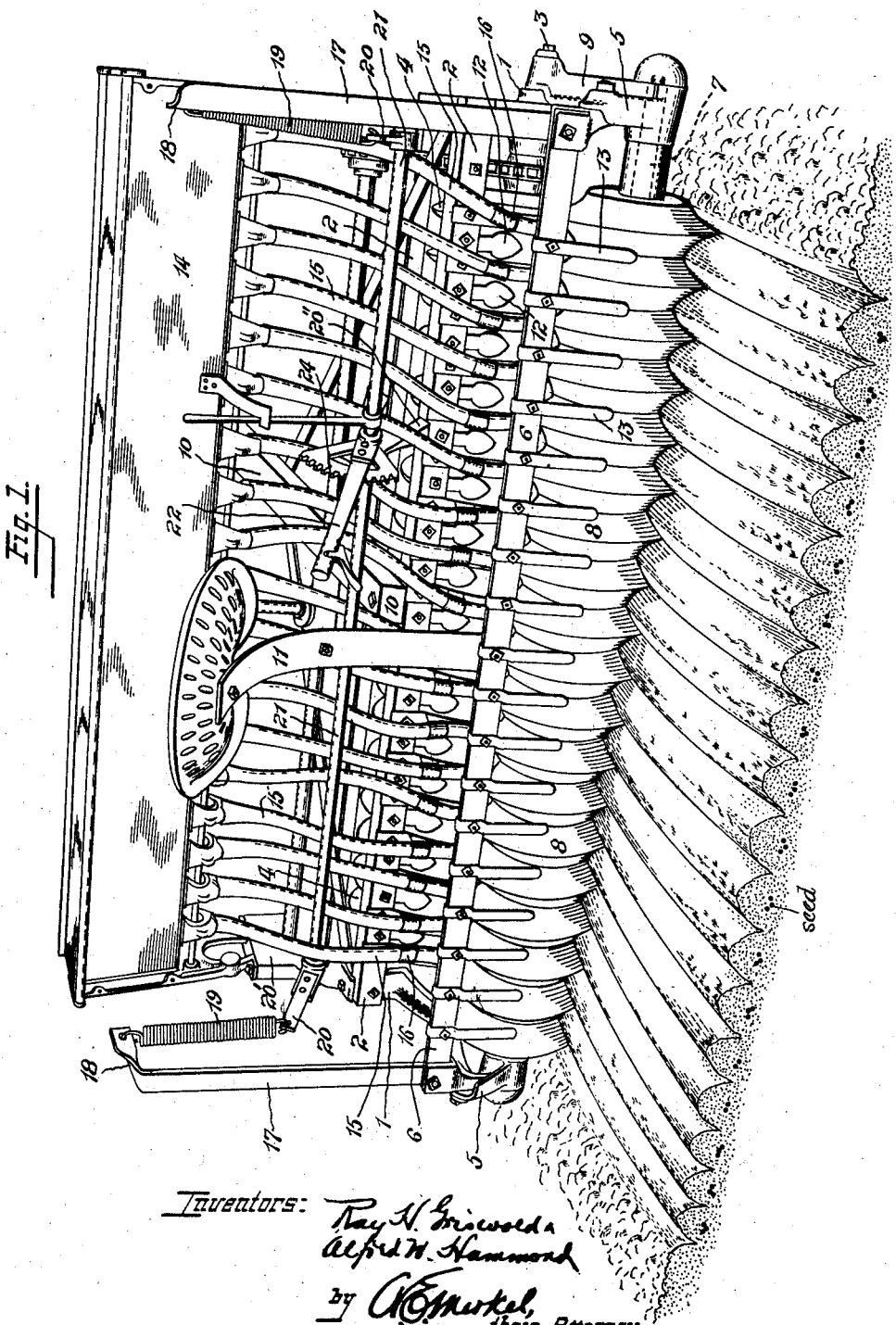

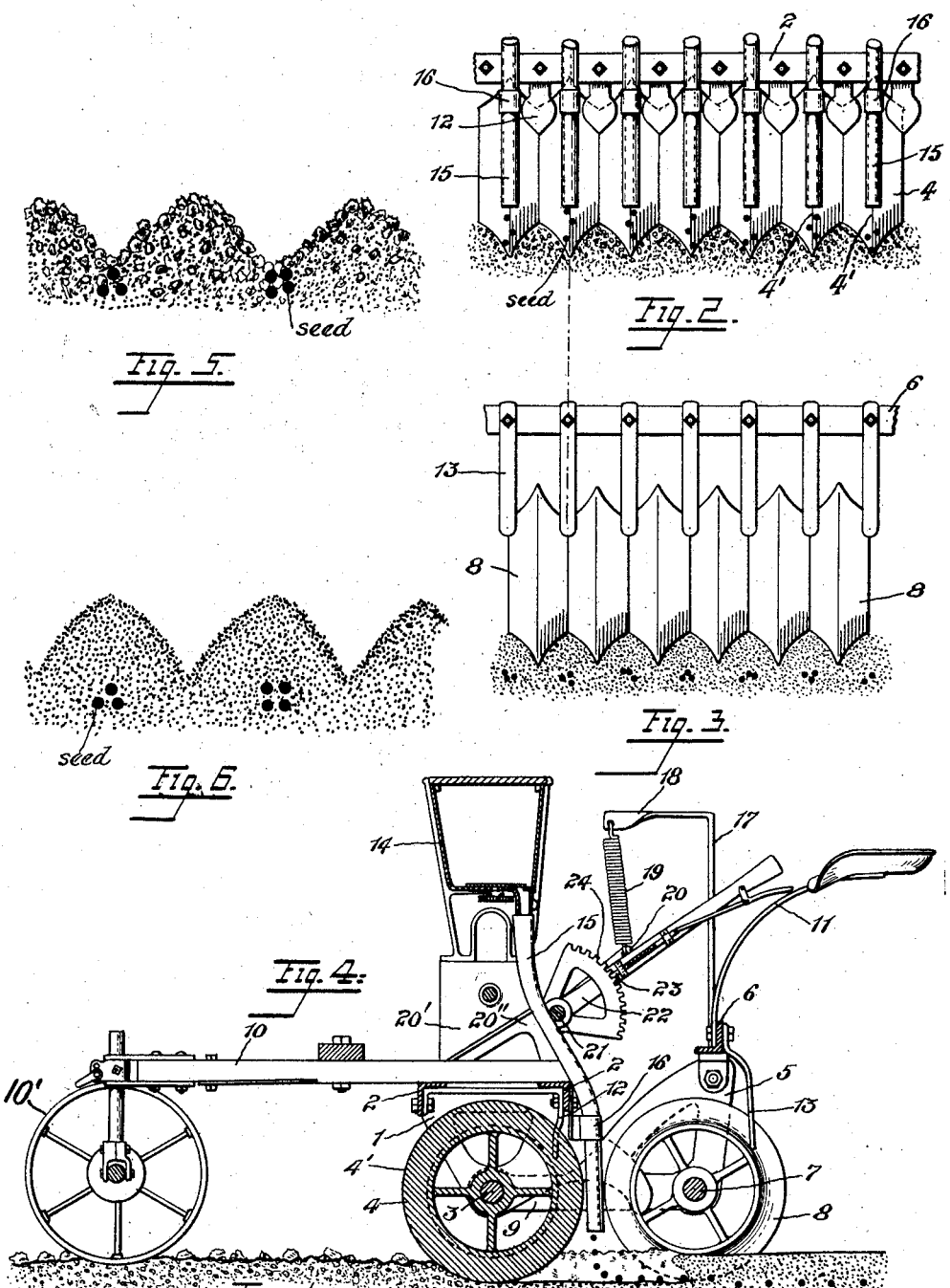

UNITED STATES PATENT OFFICE.

RAY H. GRISWOLD AND ALFRED W. HAMMOND, OF CLEVELAND, OHIO, ASSIGNORS TO THE DUNHAM COMPANY, OF BEREA, OHIO, A CORPORATION OF OHIO.

APPARATUS FOR SEEDING.

1,340,654.      Specification of Letters Patent.      Patented May 18, 1920.

Application filed April 21, 1916. Serial No. 92,726.

*To all whom it may concern:*

Be it known that we, RAY H. GRISWOLD and ALFRED W. HAMMOND, citizens of the United States, residents of Cleveland, county of Cuyahoga, and State of Ohio, have invented a new and useful Improvement in Apparatus for Seeding, of which the following is a specification, the principle of the invention being herein explained and the best mode in which we have contemplated applying that principle, so as to distinguish it from other inventions.

Our invention relates to improvements in an apparatus for seeding grain or other seeds in such a way as to bring about a complete and speedy germination and vigorous growth of the seed and to obviate the difficulties incident to the usual methods of seeding which have resulted in delay in or failure of germination and in a large loss of seed and hence of crops, the general object being to obtain a maximum result from a given planting of seed.

We have observed that the usual method of seeding in rows along the bottom of a small furrow and simply covering the seed with loose earth, fails to be productive of the best result particularly in the case of fall seeded winter wheat, for in many instances the seed either does not germinate properly or fails to germinate at all. Such failure or improper germination occurs either for the reason that the ice or frost forming in the furrow after fall planting often causes the seed to be lifted out of its position and its germination is either delayed or entirely destroyed, or because the soil above the seed is not packed and pulverized in such a way as to form a proper mulch, or is not formed so as to absorb the required heat accompanying the sunlight.

In order to promote the most successful germination and speedy growth of seed, the depth at which the seed is planted; the degree of pulverization of the soil in which it is sown; the tightness with which this soil is packed around the seed and the formation of the surface of the soil adjacent to and above the seed, where it will be held in one position for germinating purposes and where a maximum amount of heat of the sun will be absorbed by the germinating bed and produce a speedy and certain germination, are all of vital importance.

Our apparatus is designed to, and does accomplish these results and overcomes the disadvantages incident to the usual old methods referred to.

Our invention has for another of its objects to provide a seeding apparatus wherein the soil is twice pulverized and packed simultaneously with the seeding operation, and to provide a mechanism for simultaneously crushing and pulverizing the earth and molding it into a series of narrow ridges between which the lines of grain are deposited, in combination with means for subsequently furrowing said ridges and laterally shifting each side of them to cover the seed and form a new series of narrow ridges having exteriors of well packed and cores of somewhat softer pulverized earth directly over the seed, and leaving small furrows between the rows of planted seed.

Other objects and advantages of the invention will hereinafter appear.

The annexed drawings and the following description set forth in detail certain means for carrying out our invention, the disclosed means, however, constituting but one of various mechanical forms in which the principle of the invention may be employed.

In said annexed drawings:

Figure 1 represents a perspective of a seeder embodying our invention, viewed from the rear.

Fig. 2 represents a fragmentary, transverse sectional view taken upon a vertical plane passing midway between the front and rear gangs of packer-wheels, showing also the adjacent soil in vertical section.

Fig. 3 represents a fragmentary elevation, showing a portion of the rear gang of packer-wheels and showing the adjacent soil in vertical section and the seeds as positioned therein upon completion of the seeding operation.

Fig. 4 represents a vertical, longitudinal sectional view of the seeder taken through the middle of one of the front packer-wheels.

Fig. 5 represents a transverse sectional view on a larger scale, showing the position and environment of seed deposited as is now customary, and Fig. 6 represents a similar view, showing the position and environment of seed planted according to our invention.

In the illustrated disclosure of our invention, we provide front frame pieces 1, rigidly connected by means of suitable angle-bars 2 and having bearings for a front axle 3 upon which a gang of freely revoluble packer-wheels 4 is mounted. Each of the packer-wheels 4 is formed with a wedging peripheral portion 4' so designed as to sink deep into a broken field and crush and pulverize the lumps of earth which it strikes. Two rear frame-members 5 are provided, connected with each other by means of angle-bar 6, and each having a forwardly extending arm 9 having at its forward end a bearing for the axle 3, whereby the entire rear framework is provided with a hinged or rocking connection with the front framework, for a purpose to be explained; and in which is mounted a rear axle 7 upon which latter is mounted a gang of packer-wheels 8, constructed similarly to the wheels 4, and of equal size therewith substantially but arranged in staggered relation thereto, as shown in Figs. 2 and 3, the construction being such that the track made by each forward crushing and packing wheel 4 will be straddled by two rear packer-wheels.

A stub-tongue 10 is secured to the angle bars 2 and preferably supported at its forward end by a fore-truck 10', as indicated in Fig. 4, as is common in agricultural machinery where it is desired to relieve the horses' necks of the weight thereof. Of course the fore-truck is not a necessity, and may be omitted if desired. Secured upon the rear angle-bar 6 in any desired manner is a suitable seat 11, from which the various controls for the machine may be conveniently manipulated. Suitable scrapers 12 and 13 are provided for the front and rear wheels.

Mounted upon the front portion of the frame in any desired manner, is a seed-reservoir or container 14, which runs transversely throughout and substantially the width of the device and has connected with its bottom a plurality of seeder-tubes 15. These tubes are suitably secured as by means of brackets 16, Fig. 4, and their lower ends project between the front and rear gangs of wheels, immediately behind each front wheel 4 (see Fig. 2). Each tube is designed to drop seed into the bottom of the furrow or trench made by its associated packer-wheel 4, and for that purpose means are provided, such as an agitator or the like, (not shown in detail), for assuring a continuous and required feeding of seeds into the tubes, from which they drop by gravity.

Rigidly mounted upon the rear members 5, above described, are uprights 17 having horizontal projections 18 at their tops and constructed of heavy angle-iron. Strong depending coil-springs 19 are connected at their tops to the extensions 18 and at their lower ends to arms 20, rigidly secured to a shaft 21 revolubly mounted in the frame members 20', which are firmly bolted to the angle-irons 2. The shaft 21 has rigidly mounted thereon a lever 22 provided with a manually operable pawl 23, adapted to engage the toothed sector 24 rigidly mounted upon an intermediate frame member 20''; the lever 22 being within reach of the operator.

It will be readily seen that by this construction the leading gang of crushing and packer-wheels 4 is, in a sense, suspended from and "floats" upon the rear axles 7 of the machine, so that by means of the resilient connection provided by coil-springs 19 the fore-truck 10' assisting, this gang may be raised or lowered at will by the operator, and in addition its downward crushing force upon the broken earth in which it operates, may be manually regulated. The operator can, therefore, readily control the depth of the small furrows formed by the leading gang of packer-wheels, and, hence control the depth at which the seed will be deposited in the ground. The disks being all of equal size are interchangeable, and the disturbance of the soil by the rear row disks is of the same kind though not necessarily of the same degree, as that of the front row.

In operation, it being understood that the machine is being drawn across a broken field by draft animals, or the like, the leading packing and crushing wheels 4 break up, crush and disintegrate the lumps of earth against which they impinge at the same time molding the crushed earth into narrow and shallow furrows and narrow ridges of packed and pulverized earth; the depth of the furrows being controlled by the adjustment of the lever 22.

The seed-depositing tubes 15, immediately following the leading gang of packer-wheels, drop rows of seed into the bottom of the trenches formed thereby. The rear gang of packer-wheels 8, which, as has been stated, are so arranged that each pair thereof straddles a small furrow formed by a leading packer-wheel 4, bisects the ridges formed by the packer-wheels 4, again crushing and pulverizing the earth and positively shifting the soil from both sides toward the line of seeding, so as to again mold the soil into furrows and ridges, the furrows, however, being formed in place of the previously-formed ridges, and ridges being formed where there were before furrows, with the result that the seed is thereby located at approximately the somewhat softer centers of ridges having outside portions of well packed and pulverized soil, in a fashion to promote its rapid germination and vigorous growth, by reason of the conservation and absorption of ample moisture and the presentation of an increased area to the warming rays of the sun.

It is to be noted that the crushing, packing and pulverizing effect of the rear gang of wheels 8 is augmented by the weight of the operator, as well as by the, at least partial, suspension of the front gang of wheels from the rear axle.

Fig. 6 is a cross-sectional view, indicating the location, arrangement and environment of seed sown according to our new method and by our new machine, as contrasted with the showing in Fig. 5, which represents the prevailing method of planting seeds.

It will be obvious to anyone skilled in the art that the above specific arrangement of parts may be varied in many ways without departing from the spirit of our invention. For instance, it may be found practical to dispense with the front gang of wheels entirely and have but a single gang with the seeding tubes placed immediately in front thereof, and in the same relative position in which they are shown with reference to the rear gang of wheels in Fig. 3, the rear gang being depended upon to cover the seed by shifting loose earth laterally thereover, or, it might be found practical to place the seeding tubes immediately in front of the front gang of wheels of a machine constructed according to the drawings herein, and in the same relative position therein as is shown in Fig. 2. It might also be found advisable to vary the form of either the front or rear gangs of wheels by substituting sprocket wheels therefor instead of the ribbed wheels shown, or by using both ribbed and sprocket wheels in either the front or rear gang, or in both. A further variation might be employed by substituting disk harrows for the above-mentioned wheels or by utilizing fixed plows in contradistinction to rotating packer or cultivator-wheels, or a combination of fixed plows and rotating elements may be used, all as will be apparent to those skilled in the art.

Having fully described our invention, what we claim and desire to secure by Letters Patent is:—

1. A seed drill comprising a series of compacting and pulverizing disks arranged close together, each of said disks being provided with a wedging and compacting peripheral portion, seed tubes, at the rear of said disks, a second series of disks mounted on a frame adjustable relative to the first series to alter the angular relation thereto with respect to the horizotnal line of draft, whereby the effect of the rear gang may be varied to suit soil conditions, and a connecting means to hold the two gangs in their adjusted relation, and the disks of each gang in the proper relation to each other, substantially as shown and described and for the purpose set forth.

2. A seed drill comprising a series of packing and pulverizing wheels arranged close together, each of said wheels being provided with a wedging peripheral portion so designed as to sink deep into the broken field for crushing and pulverizing lumps of earth which it may strike, whereby the wheels of the series are adapted to form a close succession of completely molded closely set ridges, means for depositing seed in the furrows between said ridges, a second series of wheels of substantially the same type and size as the first wheels, adapted to follow them and split the said ridges and form molded ridges of completely packed and pulverized soil over the seed in the furrows, the contour of the wheels being such as to separate the prepared earth, crush it, and at the same time mold it completely, and means for adjusting the second series relative to the first and for holding it in various positions of adjustment.

3. A seed drill comprising a series of packing and pulverizing wheels arranged close together upon an axle, and adapted to form ridges, means for depositing rows of seed between the furrows of said ridges, a following series of axle mounted disks arranged to split the ridges made by the first series and to form a second series of ridges packed and compressed over the seed, an upright upon said rear axle, springs connected to said upright connections from said spring to the first named axle, a pivot connection between the rear axle and the first axle, a tongue and truck therefor, and means whereby the tension of the springs may be adjusted so as to give the disks of the forward set greater or less hold upon the soil.

Signed by us, this 20th day of April, 1916.

RAY H. GRISWOLD.
A. W. HAMMOND.